(12) United States Patent
Dwivedi et al.

(10) Patent No.: US 10,994,941 B1
(45) Date of Patent: May 4, 2021

(54) REMOVABLE CONVEYOR CARTRIDGE ASSEMBLIES FOR MOBILE CARRIER UNITS

(71) Applicant: Amazon Technologies, Inc., Seattle, WA (US)

(72) Inventors: Rajeev Dwivedi, Sammamish, WA (US); Vivek S. Narayanan, Sammamish, WA (US); Ganesh Krishnamoorthy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/655,608

(22) Filed: Oct. 17, 2019

(51) Int. Cl.
| | |
|---|---|
| *B65G 17/34* | (2006.01) |
| *B65G 23/44* | (2006.01) |
| *B07C 3/08* | (2006.01) |
| *B65G 15/58* | (2006.01) |
| *B65G 35/06* | (2006.01) |
| *B65G 47/24* | (2006.01) |

(52) U.S. Cl.
CPC .............. *B65G 23/44* (2013.01); *B07C 3/082* (2013.01); *B65G 15/58* (2013.01); *B65G 35/06* (2013.01); *B65G 47/24* (2013.01); *B65G 2207/30* (2013.01); *B65G 2811/06* (2013.01)

(58) Field of Classification Search
CPC ...... B65G 15/58; B65G 17/345; B65G 21/22; B65G 21/2036; B65G 23/44; B65G 47/46; B07C 3/082; B60L 13/03
USPC ............. 198/370.1, 370.06, 481.1, 574, 619, 198/689.1, 802, 816, 860.3, 890
See application file for complete search history.

(56) References Cited

U.S. PATENT DOCUMENTS

| | | | | |
|---|---|---|---|---|
| 3,550,748 A | * | 12/1970 | Werner ................ | B65G 17/345 198/370.06 |
| 3,878,937 A | * | 4/1975 | Glaser ................... | B65G 23/22 198/835 |
| 3,929,219 A | * | 12/1975 | Malcolm ............ | B65G 69/0408 198/571 |
| 4,096,936 A | * | 6/1978 | Nielsen ................ | B65G 17/345 198/370.06 |
| 4,353,457 A | * | 10/1982 | Haley ...................... | B65G 1/06 198/468.6 |
| 4,478,329 A | * | 10/1984 | Heiz ...................... | B65G 65/00 198/574 |
| 4,545,186 A | * | 10/1985 | MacCanna ............. | A01G 18/70 56/327.1 |
| 4,679,977 A | * | 7/1987 | Minami ................. | B62D 61/04 198/574 |
| 4,781,281 A | * | 11/1988 | Canziani .............. | B65G 17/345 198/370.06 |

(Continued)

*Primary Examiner* — Joseph A Dillon, Jr.
(74) *Attorney, Agent, or Firm* — Eversheds Sutherland (US) LLP

(57) ABSTRACT

Systems, methods, and computer-readable media are disclosed for removable conveyor cartridge assemblies for mobile carrier units. In one embodiment, an example removable assembly for a mobile carrier unit of a sortation system may include a frame, a conveyor belt disposed about the frame, a first sheet metal component coupled to a first side of the frame, the first sheet metal component including a first set of tabs extending from the first sheet metal component, and a tensioning device configured to tension the conveyor belt, the tensioning device having a first screw that engages a first tab of the first set of tabs.

20 Claims, 11 Drawing Sheets

(56) References Cited

U.S. PATENT DOCUMENTS

| | | | | |
|---|---|---|---|---|
| 4,801,000 | A * | 1/1989 | Canziani | B65G 17/345 198/370.06 |
| 4,884,676 | A * | 12/1989 | Suizu | B65G 17/345 198/370.06 |
| 5,324,158 | A * | 6/1994 | Shah | A24B 3/08 198/574 |
| 5,588,520 | A * | 12/1996 | Affaticati | B61B 13/08 198/370.06 |
| 5,667,058 | A * | 9/1997 | Bonnet | B65G 15/02 198/831 |
| 5,690,209 | A * | 11/1997 | Kofoed | B65G 17/345 198/370.03 |
| 6,161,683 | A * | 12/2000 | Wallis | B65G 21/105 198/813 |
| 6,209,703 | B1 * | 4/2001 | Soldavini | B65G 17/345 198/358 |
| 6,273,268 | B1 * | 8/2001 | Axmann | B65G 17/345 198/370.06 |
| 6,279,733 | B2 * | 8/2001 | Eltvedt | B65G 21/06 198/806 |
| 6,585,101 | B2 * | 7/2003 | Edwards | B65G 17/345 198/370.06 |
| 6,938,750 | B2 * | 9/2005 | Miller | B65G 17/345 198/370.04 |
| 7,080,725 | B2 * | 7/2006 | Hishinuma | B65G 17/345 198/370.06 |
| 7,395,919 | B2 * | 7/2008 | Schlagel | B65G 23/44 198/813 |
| 7,467,704 | B2 * | 12/2008 | Vertogen | B65G 15/50 198/460.1 |
| 7,987,963 | B2 * | 8/2011 | Baum | B65G 17/345 198/370.06 |
| 9,248,981 | B1 * | 2/2016 | Skoretz | B65G 47/71 |
| 9,676,566 | B2 * | 6/2017 | Porat | B07C 1/00 |
| 9,828,187 | B2 * | 11/2017 | Chierego | B65G 47/53 |
| 10,086,998 | B1 * | 10/2018 | Tilekar | B65G 1/12 |
| 10,099,860 | B2 * | 10/2018 | Droste | B65G 17/005 |
| 10,343,845 | B2 * | 7/2019 | Hoynash | B07C 3/08 |
| 10,450,142 | B1 * | 10/2019 | Best | B65G 17/345 |
| 10,717,609 | B2 * | 7/2020 | Jung-Sassmannshausen | B65G 21/10 |
| 2003/0221935 | A1 * | 12/2003 | Barklin | B65G 47/96 198/357 |
| 2013/0167751 | A1 * | 7/2013 | Rosenwinkel | B61B 13/04 104/118 |
| 2014/0014468 | A1 * | 1/2014 | Pilarz | B65G 17/345 198/370.03 |
| 2017/0057751 | A1 * | 3/2017 | Fujihara | B65G 43/00 |
| 2019/0185272 | A1 * | 6/2019 | Fumagalli | B65G 17/345 |

* cited by examiner

REMOVABLE CONVEYOR CARTRIDGE ASSEMBLIES FOR MOBILE CARRIER UNITS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks. In addition, material handling equipment to handle items, packages, or other objects may be used during various fulfillment center operations, and may be subject to downtime for maintenance and repairs. Reducing such downtime may improve overall fulfillment center operation and efficiency.

Figure 1:
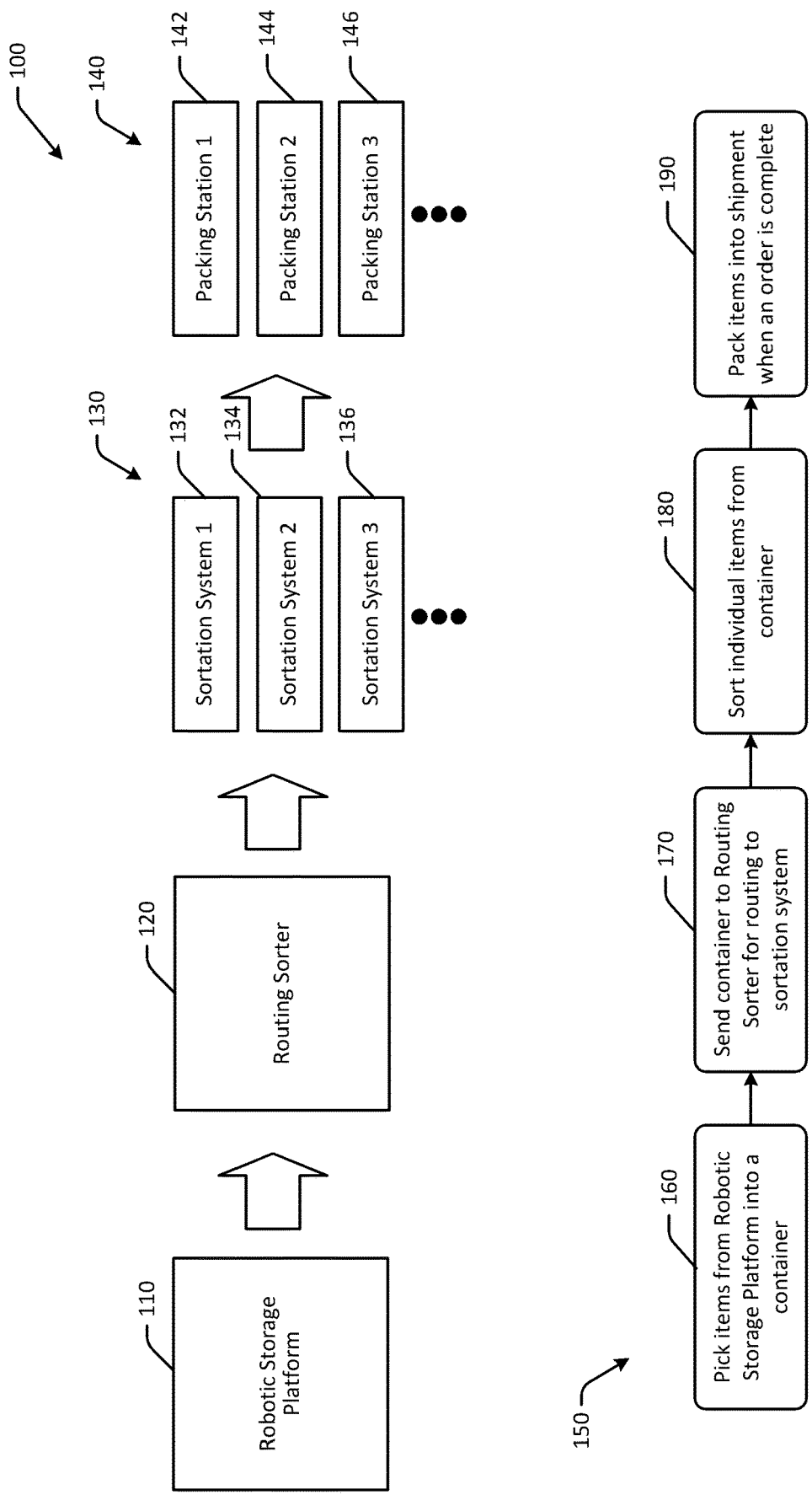
FIG. 1 is a hybrid schematic illustration of an example use case of a fulfillment center workflow and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming. Moreover, material handling equipment to handle items, packages, or other objects may be used during various fulfillment center operations, and may be subject to downtime for maintenance and repairs. Reducing such downtime may improve overall fulfillment center operation and efficiency. Embodiments of the disclosure may include removable conveyor cartridge assemblies for mobile carrier units that reduce downtime, increase ease of access and reparability of mobile carrier units and/or conveyor belts, and may provide highly repeatable alignment features to reduce negative impacts to sorting systems and other material handling equipment as a result of repairs and/or maintenance.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

In addition, certain items may be harder to transport than other items. For example, items having round, spherical, or circular geometries or other types of contoured surfaces may be difficult to transport as the items may roll or otherwise move around during transport. Moreover, item movement during transport may adversely impact the maximum speed at which the item can be transported.

Embodiments of the disclosure include removable conveyor cartridge assemblies for mobile carrier units. Mobile carrier units may be robots or shuttles used to transport items from one location to another. For example, a mobile carrier unit may receive or obtain an item that is part of a multi-item order at an induction portion of an item sorting system. The induction portion may be a portion of the system at which items for sorting are inducted into the system. The mobile carrier unit may transport the item to a container or tote in which items of the multi-item order are aggregated. The mobile carrier unit may then retrieve full containers (e.g., containers that have all of the items associated with an online order, etc.), and deliver the full containers to an outbound portion of the item sorting system.

A removable conveyor cartridge assembly may be coupled to the mobile carrier unit. During transport of items (e.g., objects, full containers, etc.), the conveyor cartridge assembly may be used to load and unload items from the mobile carrier unit. For example, the conveyor cartridge assembly may include a conveyor belt that operates to assist with pulling items onto the conveyor belt and/or pushing items off of the conveyor belt. The conveyor cartridge assembly may be removably coupled to the mobile carrier unit, such that the conveyor cartridge assembly can be removed as a single assembly or piece. The conveyor cartridge assembly may include various alignment and tensioning features that allow for quick release from the mobile carrier unit, as well as quick attachment to the mobile carrier unit. As a result, the conveyor cartridge assembly may be removed from the mobile carrier unit while the mobile carrier unit is paused or is still in service, and can be replaced as a single assembly or unit, thereby reducing the downtime of the mobile carrier unit. In addition, embodiments of the disclosure may include constraining features, such as constraining features on conveyor belts, that assist with retaining items on top of a mobile carrier unit and/or conveyor belt. As a result, a greater number of items, such as round items, may be able to be transported using robots such as mobile carrier units.

Embodiments of the disclosure include methods and systems for removable conveyor cartridge assemblies for mobile carrier units that may improve processing and fulfillment of single or multi-item orders, or orders that include more than one item. Certain embodiments include item sorting systems with sortation systems that can be used to rapidly sort items for one-to-one or one-to-many sortation needs. Some embodiments include operational process flows for improved handling of items. As a result, throughput of fulfillment centers may be improved, and/or logistics of fulfillment center operations may be less complicated.

Referring to FIG. 1, an example use case 100 of a fulfillment center workflow and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed in a container, such as a tote. Other types of fulfillment centers may include delivery stations, sort centers, and the like.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, certain functions, certain geographic regions, and so forth. The sortation systems may be used to consolidate or otherwise aggregate products for single or multi-item orders. For example, a first tote may include a first item of a multi-item order, and a second tote may include a second item of the multi-item order. The sortation system may therefore identify the orders associated with the respective products in a tote, and may transport the products to a container, such as a bin, associated with the order. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete.

Figure 2:
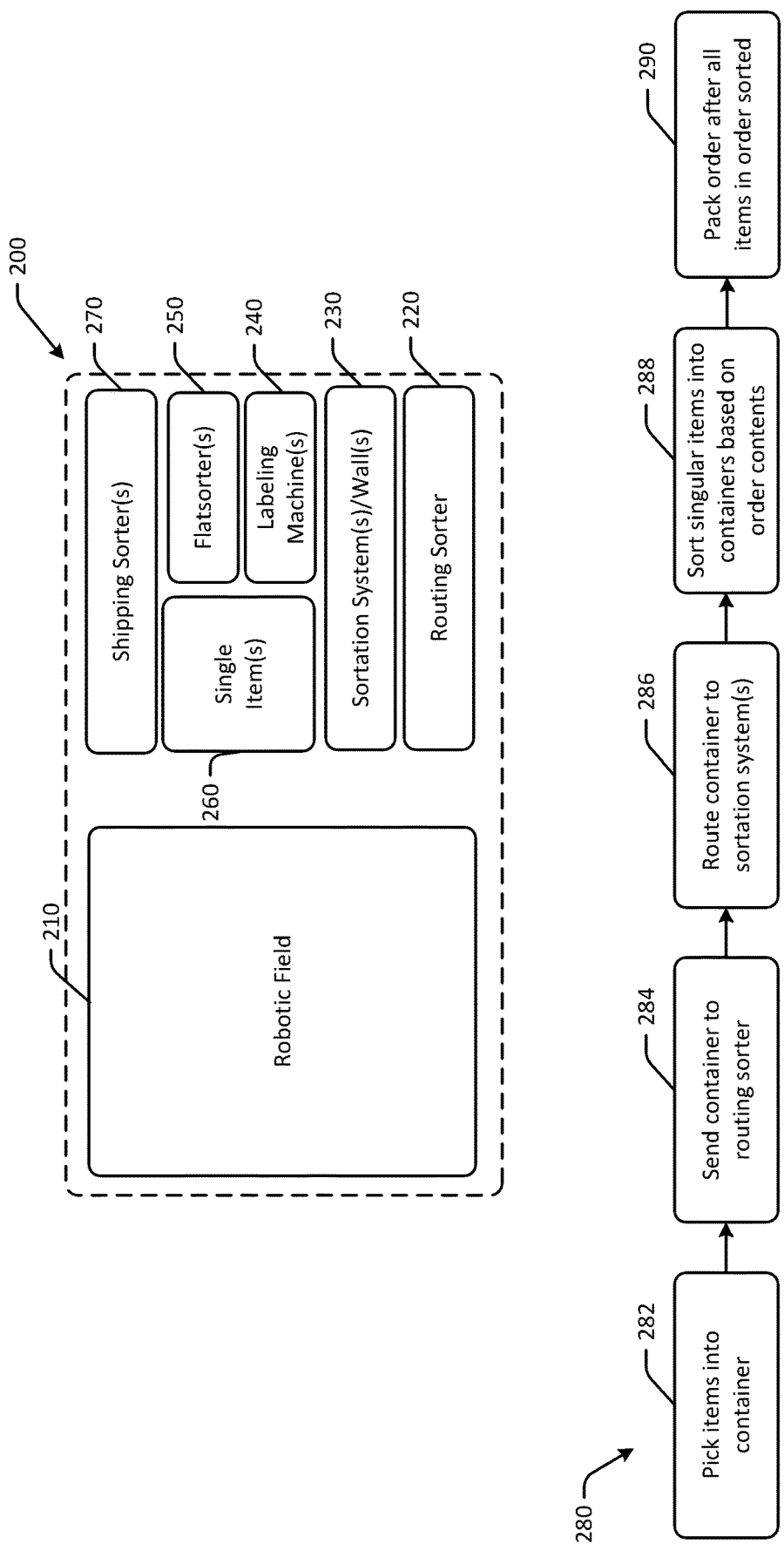
FIG. 2 is a hybrid schematic illustration of an example use case of a fulfillment center layout and an example process flow in accordance with one or more embodiments of the disclosure.

FIG. 2 is a hybrid schematic illustration of an example use case of a fulfillment center layout and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

The fulfillment center 200 may implement a process flow 280 for processing single or multi-item orders. At a first block 282, items for different orders may be picked into a tote or container that may be sent to a sorting machine, such as one of the sortation systems 230. The tote may include items from any order that is being consolidated by the specific sortation system machine. The sortation system may sort singular items into single or multi-item orders. At a second block 284, the tote may be sent to a routing sorter. At a third block 286, the routing sorter may route or divert the tote to any sortation or an assigned sortation system (e.g., the sortation system that is consolidating items for a particular order for multi-order instances, etc.). At a fourth block 288, the sortation system may sort singular items from the tote or container into a different tote or container based on the order contents. For example, the containers at the sortation system may be assigned to a particular order that may be single or multi-item. At a fifth block 290, the order may be packed after all items in the order are sorted.

The sortation system machines 220 may include bins or containers of different sizes (e.g., small, medium, large, etc.) and may be configured, in one example, to handle items that weigh up to twenty or more pounds. In some embodiments, the sortation system machines 220 may include multiple chutes, and may be configured to sort items at a rate of about 3,600 units per hour. In some instances, the sortation system machines 220 may have two inductors (e.g., one on each side, etc.) for inducting items from containers, and may be modular.

In some embodiments, the sortation system machines 220 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,500 units per hour. Certain sortation system machines 230 may be configured to handle items of up to twenty pounds, or more in some instances (e.g., 100 pounds or more), with dimensions of about 18"×14"×8" or 28"×14"×9", which may cover almost all, or all, products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.).

Accordingly, in some embodiments, sortation systems may be arranged in rows and may receive assigned totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include removable conveyor cartridge assemblies for mobile carrier units. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 3:
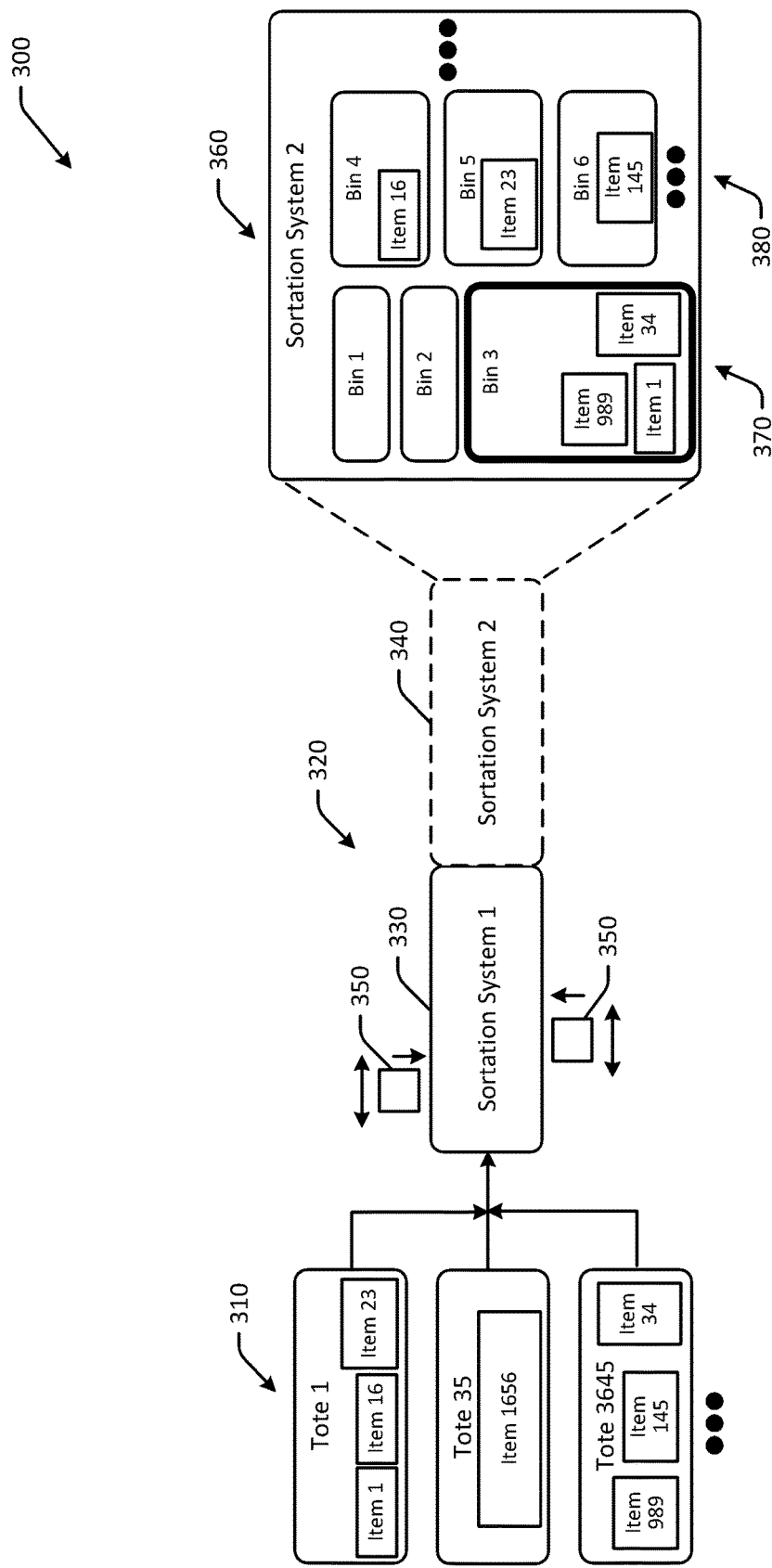
FIG. 3 is a schematic illustration of an item sorting system and additional components in accordance with one or more embodiments of the disclosure.

FIG. 3 is a schematic illustration of an item sorting system and additional components in accordance with one or more embodiments of the disclosure. Other embodiments may include additional or fewer components. The illustration of FIG. 3 is not to scale, and may not be illustrated to scale with respect to other figures. The sortation system illustrated in FIG. 3 may be the same sortation system discussed with respect to FIGS. 1-2.

In FIG. 3, an example use case 300 including a set of totes 310 and item sorting system(s), or sortation system(s) 320, is depicted. The set of totes 310 may include one or more totes that may be assigned to, or otherwise associated with, the sortation system 320. For example, Tote 1, Tote 35, Tote 3645, and so forth may be associated with the sortation system 320. The totes may have identifiers, such as alphanumeric or other identifiers. The totes may be used to place items that have been picked into the totes. The items that are placed in the totes may be associated with orders that are to be consolidated by the sortation system 320. For example, Tote 1 may include item 1, item 16, and item 23, Tote 35 may include item 1656, Tote 3645 may include item 989, item 145, and item 34, and so forth. The item sorting system, or the sortation system 320, may be configured to receive items from a tote that includes one or more, such as multiple items, and the tote may be routed to the item sorting system or the sortation system 320.

The totes 310 may be directed to the sortation system 320 for sorting and consolidation. For example, items in the totes 310 may be inducted into the sortation system 320 via a conveyor belt.

The sortation system 320 may include one or more modules, and may be adjusted in size by adding or removing modules or standalone sortation systems as needed. For example, the sortation system 320 may include a first sortation system 330 and a second sortation system 340. The second sortation system 340 may be coupled to the first sortation system 330, or may be a standalone sortation system.

The respective sortation systems 330, 340 may include one or more bins, or containers that hold items of a single or multi-item order. For example, as illustrated in side view 360, the second modular item sorting machine 340 may include a first chute 370, or vertical stacking, of bins, and a second chute 380 of bins. The bins in the respective chutes may be of different sizes or dimensions, or may be placed in different vertical locations along the chute. The sortation system 320 may include a plurality of bins disposed in an array along one or more sides of the first modular item sorting machine 330 and the second modular item sorting machine 340. The respective bins may be configured to be repositioned within different chutes and/or at different vertical locations. In FIG. 3, Bin 1 and Bin 2 may have the same height, while Bin 3 in the same column or chute may have a different height. Any suitable number of bins may be included in a chute and/or array.

Items or products inducted from the totes 310 may be sorted and directed to a bin associated with the order for which the item was picked. The items may be transported by one or more shuttles or mobile carrier units 350, which may move in one or more directions within the sortation system 320. In some embodiments, the shuttles or mobile carrier units 350 may be positioned outside of the sortation system 320. In some embodiments, the sortation system(s) 320 may include one or more mobile carrier units 350 or other shuttles that can be used to move items, such as products, packages, containers, and so forth. Mobile carrier units 350 may include one or more RFIDs that can be used to retain traceability of an item to a carrier, such that the entire system may not have to be purged in case of a complete power loss. The lineage or traceability can be established by associating a barcode or other identifier of the item with the carrier RFID tag at the point of induction or elsewhere.

For example, Item 1 may be inducted from Tote 1 and placed in Bin 3, along with Item 989 and Item 34 from Tote 3645. Bin 3 may be associated with an order that included those three items, and may therefore be ready for packing. Similarly, Item 16 may be routed to Bin 4, Item 23 may be routed to Bin 5, Item 145 may be routed to Bin 6, and so forth. Any number of bins, totes, and/or modules may be included.

Figure 4:
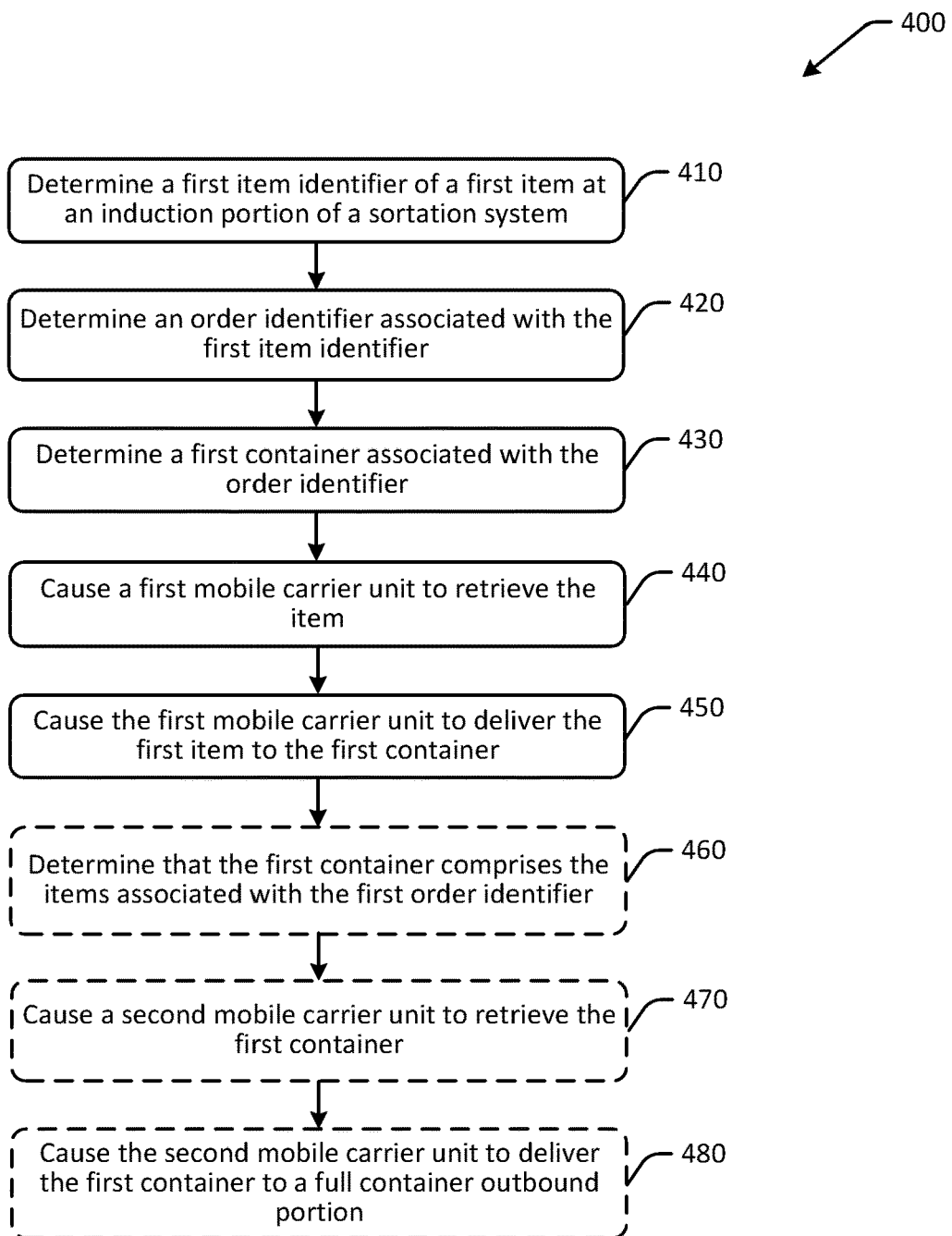
FIG. 4 is a schematic illustration of an example process flow for item sortation in accordance with one or more embodiments of the disclosure.

FIG. 4 is a schematic illustration of an example process flow 400 for item sortation in accordance with one or more embodiments of the disclosure. One or more of the blocks illustrated in FIG. 4 may be performed in a different order or across a distributed environment. In some embodiments, the operations of process flow 400 may be performed by a controller or computer system in communication with one or more sortation systems.

At block 410, a first item identifier of a first item at an induction portion of a sortation system may be determined. For example, a computer system or controller having one or more computer processors coupled to memory and configured to execute computer-executable instructions may be configured to determine a first item identifier of a first item at an induction portion of a sortation system. The first item identifier may be a barcode or other machine readable identifier. To determine the first item identifier, the computer system may determine the identifier using a scanner or other component. The first item identifier may be associated with a first item. The first item may be part of an order, such as an online order, and may therefore be associated with an order identifier. The induction portion of the sortation system may be a portion of the sortation system at which items or containers are input or fed into the sortation system. In some instances, the items or containers may be input manually, while in other instances, the items or containers may be automatically fed into the sortation system using materials handling equipment. The computer system may be local or remote relative to the sortation system, and may be in wired or wireless communication with one or more components of the sortation system. In some embodiments, determination of a first item may be completed using various inspection methods, such as weight scans (e.g., using a weight sensor to determine whether an item weight comports with an expected item weight, etc.) or volumetric scans (e.g., using computer vision point cloud to determine whether a size of an item comports with an expected item size, etc.) in addition to, or instead of, barcode scans as a secondary verification to ensure that the item is accurately identified. For example, a barcode scan may be inaccurate due to more than one label on an item or package, etc., so a secondary volumetric scan may provide additional verification. If secondary verification does not result in identification of the item, the item or package may be routed to a location for subsequent automated or manual inspection.

At block 420, an order identifier associated with the first item identifier may be determined. For example, the computer system may determine an order identifier associated with the first item identifier. The order identifier may be associated with each of the item identifiers in an order. The computer system may determine, for example using a database, the order identifier associated with the first item identifier. In some instances, the first item identifier may be associated with more than one order identifier. In such instances, the computer system may determine the order identifier that corresponds to the order that is being sorted by the sortation system, as opposed to a different sortation system.

At block 430, a first container associated with the order identifier may be determined. For example, the computer system may determine a first container associated with the order identifier. The sortation system may include a number of different containers, such as totes, bins, or bags, and the like. The containers may be used to aggregate items for certain orders, packages destined for similar destinations, and so forth. Accordingly, a single container may be associated with one or more order identifiers in some instances. The computer system may determine the first container that is located at the sortation system that is being used to aggregate items for the order identifier. The order identifier associated with a container may remain static until all of the items associated with the order are aggregated in the container.

At block 440, a first mobile carrier unit may be caused to retrieve the first item. For example, the computer system may be configured to cause a first mobile carrier unit to retrieve the item. The computer system may be in communication with one or more mobile carrier units. Mobile carrier units may be configured to retrieve items and/or deposit items into containers, retrieve and/or deposit empty containers into container slots, retrieve and/or deposit full or completed containers to an outbound portion of the sortation system, and so forth. The mobile carrier units may be configured to move about the sortation system using any suitable form of propulsion, such as motors, rollers, belts, mobile drive units, and so forth. Mobile carrier units may include components configured to move items and containers, such as rollers, arms, sidewalls, and/or other components. The computer system may send instructions or commands to a particular mobile carrier unit to retrieve the first item from the induction portion of the sortation system. The mobile carrier unit may therefore maneuver to the induction portion to retrieve or otherwise receive the first item. The mobile carrier unit may be coupled to, or may include, a removable conveyor cartridge assembly.

At block 450, the first mobile carrier unit may be caused to deliver the first item to the first container. For example, the computer system may cause the first mobile carrier unit to deliver the first item to the first container. The computer system may send instructions or commands to the first mobile carrier unit to navigate to the designated first container, and to deposit or deliver the first item to the first container. The first mobile carrier unit may navigate to the first container using one or more ramps in some instances, or an elevator lift in other instances. For example, the computer system may cause a track-based pathway to configure a path on which the first mobile carrier unit can move to reach the first container. The first container may be on different levels of the sortation system, and the computer system may cause the first mobile carrier unit to follow the path and/or take an elevator to the appropriate level to reach the first container. The mobile carrier unit may be coupled to, or may include, a removable conveyor cartridge assembly.

At optional block 460, it may be determined that the first container comprises the items associated with the first order identifier. For example, the computer system may determine that the first container comprises the items associated with the first order identifier. The first order identifier may be associated with one or more items, and may therefore be associated with one or more items. The computer system may determine that the one or more items are positioned in the first container. For example, all of the items in the order may have been placed into the first container by one or more mobile carrier units. For orders with multiple items, the computer system may determine that the order identifier is associated with a second item identifier of a second item, and may determine that the first container includes the first item and the second item. The computer system may therefore track items that are input and output from the sortation system, as well as the contents of respective containers during the sortation process. In some embodiments, the carrier units may be the same for both item delivery and tote extraction, whereas in other embodiments, the carrier units may be different for item delivery and tote extraction. For example, carrier units used for tote extraction may include additional or different hardware than carrier units used for item or package delivery to containers.

At optional block 460, a second mobile carrier unit may be caused to retrieve the first container. For example, the computer system may cause a second mobile carrier unit to retrieve the first container. In some instances, the second mobile carrier unit may be the same unit as the first mobile carrier unit, while in other instances, the second mobile carrier unit may be a different unit. To retrieve the first container, the mobile carrier unit may navigate to the container slot in which the first container is present, and may retrieve the first container. For example, the mobile carrier unit may pull the container out of the container slot, or the container slot may include hardware, such as a tilting floor, an extendable arm, powered rollers, or other hardware to push or deposit the container onto the mobile carrier unit.

At optional block 480, the second mobile carrier unit may be caused to deliver the first container to a full container outbound portion of the sortation system. For example, the computer system may cause the second mobile carrier unit to deliver the first container to a full container outbound portion. After the container includes all of the items in an order, the container may be determined to be full. In some instances, a full container may not be physically full. In other instances, a full container may be physically full. The full container outbound portion of the sortation system may be a conveyor belt or other portion of the sortation system to which containers that are outbound from the sortation system may be routed. The containers that are outbound may include sorted items. After full containers are removed from the sortation system, the container slot from which the full container was removed may be replaced with an empty container, which may then be associated with a different order identifier. For example, the computer system may cause a container elevator to move a container from an empty container inbound portion to the first mobile carrier unit. The empty container inbound portion may be an input queue or holding at which empty containers may be input or fed into the sortation system.

In some embodiments, instead of, or in addition to, determining that the first container comprises the items associated with the first order identifier, the computer system may determine that the container is full. A full container may include a certain predetermined set of items, or may be physically full. The computer system may then cause a mobile carrier unit to retrieve the second container after delivering the first item to the first container. For example, a mobile carrier unit, during the same trip through a container matrix, may first deliver an item, and may then retrieve a full container for delivery to the outbound portion to improve efficiency.

Figure 5:
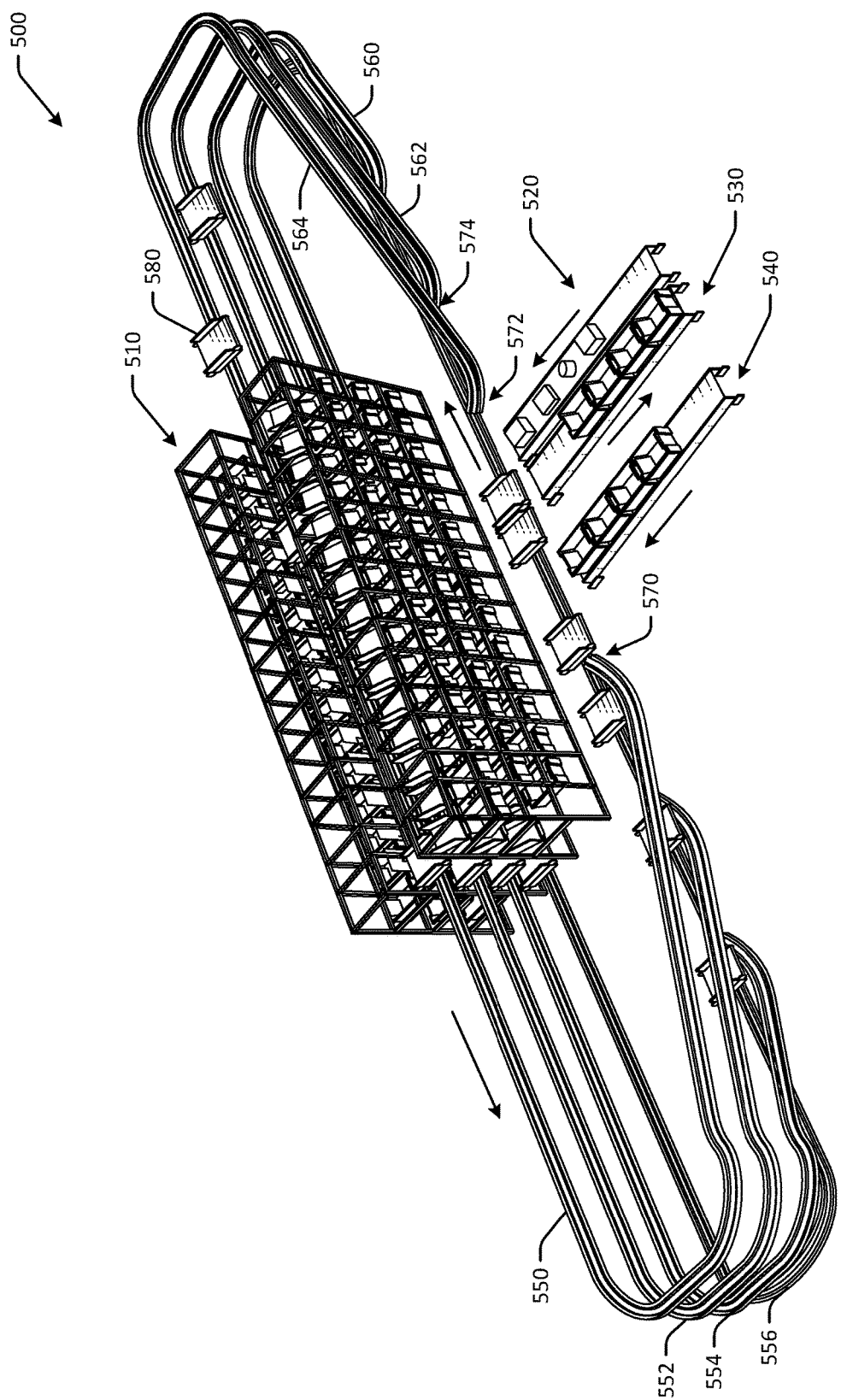
FIG. 5 is a schematic illustration of a sortation system with ramps in accordance with one or more embodiments of the disclosure.

FIG. 5 is a schematic illustration of a sortation system 500 with ramps in accordance with one or more embodiments of the disclosure. Other embodiments may include additional or fewer components. For example, other sortation systems may include elevators instead of, or in addition to, ramps. The illustration of FIG. 5 may not be to scale, and may not be illustrated to scale with respect to other figures. The sortation system illustrated in FIG. 5 may be the same sortation system discussed with respect to FIGS. 1-4.

In FIG. 5, the sortation system 500 may include a container matrix 510, an induction portion 520, an outbound portion 530, an empty container intake portion 540, one or more tracks, and one or more mobile carrier units 580. In the illustrated example, the sortation system 500 may have a length of about seventy feet and a width of about eight feet.

The container matrix 510 may be a modular rack system that includes one or more vertically spaced or horizontally spaced levels, where some or all of the levels may include container slots. The container matrix 510 may house containers, such as totes, bins, bags, or other containers, that can be used to hold sorted items, such as items that correspond to certain orders. The container matrix 510 may include an array of containers with removable and/or rearrange-able container configurations. The containers may be of the same or different dimensions. The container matrix 510 may include one or more levels, such as a first level and a second level. The first level may include a first plurality of container slots configured to receive individual containers, and the second level may include a second plurality of container slots configured to receive individual containers. The first level may be an upper level or lower level with respect to the second level.

The induction portion 520 may be an induction point for items, such as products or packages, that are input at the sortation system 500 for sortation. The sortation system 500 may sort the inducted items into various containers at the container matrix 510. Items input at the induction portion 520 may be retrieved by one or more of the mobile carrier units 580 and fed or deposited into designated containers. At the induction portion 520, an item may be identified, and a computer system may send the mobile carrier unit 580 instructions to retrieve the item and deliver the item to a specific location. The computer system may manage traffic flow of mobile carrier units 580 throughout the sortation system 500, so as to improve efficiency and avoid collisions. The induction portion 520 may be configured to transport individual items into the sortation system 500.

The outbound portion 530 may be where containers that are full, or that include all of the items in an order, may be directed after completion of sortation. For example, containers that are ready to move to a different stage or portion of a fulfillment center may be retrieved from the container matrix 510 by one or more of the mobile carrier units 580 and delivered to the outbound portion 530. The outbound portion 530 may be configured to transport full containers out of the sortation system 500.

The empty container intake portion 540 may be where empty containers are input to the sortation system 500. For example, as full or completed containers are removed from container slots at the container matrix 510, the container slots may be filled with empty containers. For example, one or more mobile carrier units may retrieve an empty container from the empty container intake portion 540 and deliver the empty container to an empty container slot. In some embodiments, the mobile carrier unit may retrieve an empty container after delivering a completed container, such as by moving backwards or forwards along a track. Although the inbound portion 520, outbound portion 530, and empty container intake portion 540 are illustrated in a certain arrangement in FIG. 5, other arrangements may be used. For example, the empty container intake portion 540 may be placed on an opposite side of the inbound portion 520 relative to the outbound portion 530. The empty container intake portion 540 may be configured to transport empty containers into the sortation system 500, or to feed empty containers into the sortation system 500. The induction portion 520, the outbound portion 530, and the empty container intake portion 540 may optionally include conveyor belts, and may be disposed adjacent to each other.

The sortation system 500 may include one or more tracks. The tracks may be used by the mobile carrier units 580 to move between the respective portions of the sortation system 500 and the container matrix 510. For example, the mobile carrier unit 580 may move along a certain track or set of tracks to reach a first container, and along a different set of tracks to reach a second container. Tracks may lead to different levels of the container matrix 510. In FIG. 5, the sortation system 500 may include a first track 550, a second track 552, a third track 554, and a fourth track 556. The tracks may be rails or other forms of tracks that guide the mobile carrier units 580. The tracks may be open or closed loop. The mobile carrier units 580 may move unidirectionally or bidirectionally along the tracks. In one example, the mobile carrier units 580 may move in a counterclockwise direction about the tracks. The tracks may be disposed at different levels. For example, the first track 550 may be disposed at a first level, the second track 552 may be disposed at a second level, the third track 554 may be disposed at a third level, and the fourth track 556 may be disposed at a fourth level.

The tracks and/or the sortation system 500 may include one or more ramps that lead to different levels of the container matrix 510. The ramps may be used by the mobile carrier units 580 to access the different levels of the container matrix 510 and the containers located on the different levels. For example, a first ramp 560 may lead from the fourth track 556 to the third track 554. A second ramp 562 may lead from the fourth track 556 to the second track 552. A third ramp 564 may lead from the fourth track 556 to the first track 550, and so forth. In the illustrated embodiment, the fourth track 556 may therefore be used to access the other tracks of the sortation system 500.

The fourth track 556 may serve as a queuing track, which may be a track at which unused mobile carrier units are queued as the units await instructions to retrieve or deliver items or containers, or may be used by mobile carrier units to move between different tracks and/or levels of the container matrix 510. For example, the mobile carrier unit 580 may access the third track 554 using the first ramp 560, or the second track 552 using the second ramp 562, and so forth. The mobile carrier units 580 may therefore be configured to move between the tracks via the queuing track, or the fourth track 556 in the illustration of FIG. 5. The queuing track may form a closed loop that passes through the container matrix 510.

To move between tracks or track components (e.g., ramps, etc.), the sortation system 500 may include any number of switches 570 or other mechanisms to divert mobile carrier units 580 in a certain direction or onto a certain track. Operation or configuration of switches may be controlled by the same computer system or controller that controls operation of the mobile carrier units 580, or by a different computer system. For example, a first switch 572 may be used to divert mobile carrier units 580 from the fourth track 556 to the third ramp 564, a second switch 574 may be used to divert mobile carrier units 580 from the fourth track 556 to the second ramp 562, and so forth. Switches may be used to divert mobile carrier units 580 off of ramps and back onto the fourth track 556.

The mobile carrier units 580 may individually include one or more conveyor belts, such as cross-belt conveyors or other mechanical components, and may be configured to move along the respective tracks of the sortation system 500. The mobile carrier units 580 may be configured to perform various functions, such as retrieving items, depositing items into containers on the different levels of the container matrix 150, retrieving full containers from container slots, depositing empty containers into container slots, and other functions. The mobile carrier units 580 may be controlled by one or more computer systems or controllers. The mobile carrier units 580 may include at least two sidewalls on opposite sides of the mobile carrier unit. The sidewalls may be used to secure a payload. Some embodiments may not include sidewalls. Some embodiments may include one or more doors that can be opened or closed. For example, the mobile carrier unit may include a first door disposed transverse to the at least two sidewalls, where the mobile carrier unit is configured to automatically open and/or close the first door. In some instances, the first door, when in an open position, may form a chute that can be angled towards a container on a lower level. In some instances, the mobile carrier unit may include a second door disposed opposite the first door, where the mobile carrier unit is configured to automatically open and/or close the second door. Mobile carrier units that include multiple sidewalls and/or doors that serve as sidewalls may be used to secure various types of payloads, such as round balls or objects that may remain contained within the sidewalls during movement.

The mobile carrier units 580 may travel on the track system of the sortation system 500 with fully open, partially enclosed, or fully enclosed surfaces. For example, the mobile carrier units 580 may include one or more sidewalls to secure payloads. Individual tracks about which the mobile carrier units 580 may move can be configured in open or closed loops of the sortation system 500, such that the mobile carrier units 580 may be recirculated within the system and/or moved to a holding area (e.g., the queuing track, etc.). The tracks can also be layered vertically or horizontally based on the desired throughput from the sortation system 500, as well as footprint restrictions. In some embodiments, the tracks may include diverting features and/or mechanisms, such as switches 570, that may allow individual mobile carrier units 580 to be directed to different tracks as well as different elevations vertically. As a result, the sortation system 500 may provide a flexible track layout that may include bypass loops, divert loops, etc. and consequently the ability to queue mobile carrier units 580, level load different systems of the sortation system 500 based on demand and/or any bottlenecks that may be encountered.

In some embodiments, the mobile carrier units 580 and multi-layer/multi-level tracks may be used in conjunction with a high storage density modular rack system, or the container matrix 510, that is used to receive, hold, and/or dispatch different articles, as illustrated at least in FIG. 5. The mobile carrier units 580 may be universal and can accommodate payloads of various form factors (e.g., individual items, full and empty totes, boxes, etc.). The mobile carrier units 580 may be coupled to removable conveyor cartridge assemblies, as described with respect to FIG. 6. The payload may be disposed within an open top box type enclosure with at least one or at least two fixed walls. The mobile carrier units 580 may be configured to move with various means of propulsion (e.g., conveyors, linear induction motors, drive motors, drive rollers, etc.).

The mobile carrier units 580 may include, for example on a top surface, an article movement system, such as a powered belt that can move in one or more directions, such as a direction different from the direction of motion of the mobile carrier unit 580, tilting floors or units, etc. The article movement system may be configured to move items off the carrier and into a container (e.g., totes, bags, boxes, etc.). The containers may be held inside one or more cells of the modular storage racks. A quick change interface may be provided so that different article movement technologies can be attached to the individual mobile carrier units 580. The modular rack system can contain sensing and design features to ensure that any payload on the mobile carrier units 580 is properly deposited, held and either offloaded back to the mobile carrier units 580 or an alternative takeaway option for dispatch. Modularity in the modular rack system can include individual cells to hold articles or a column or row of cells that can be individually moved or a bank of columns or rows of cells that can be moved as a unit.

Figure 6:
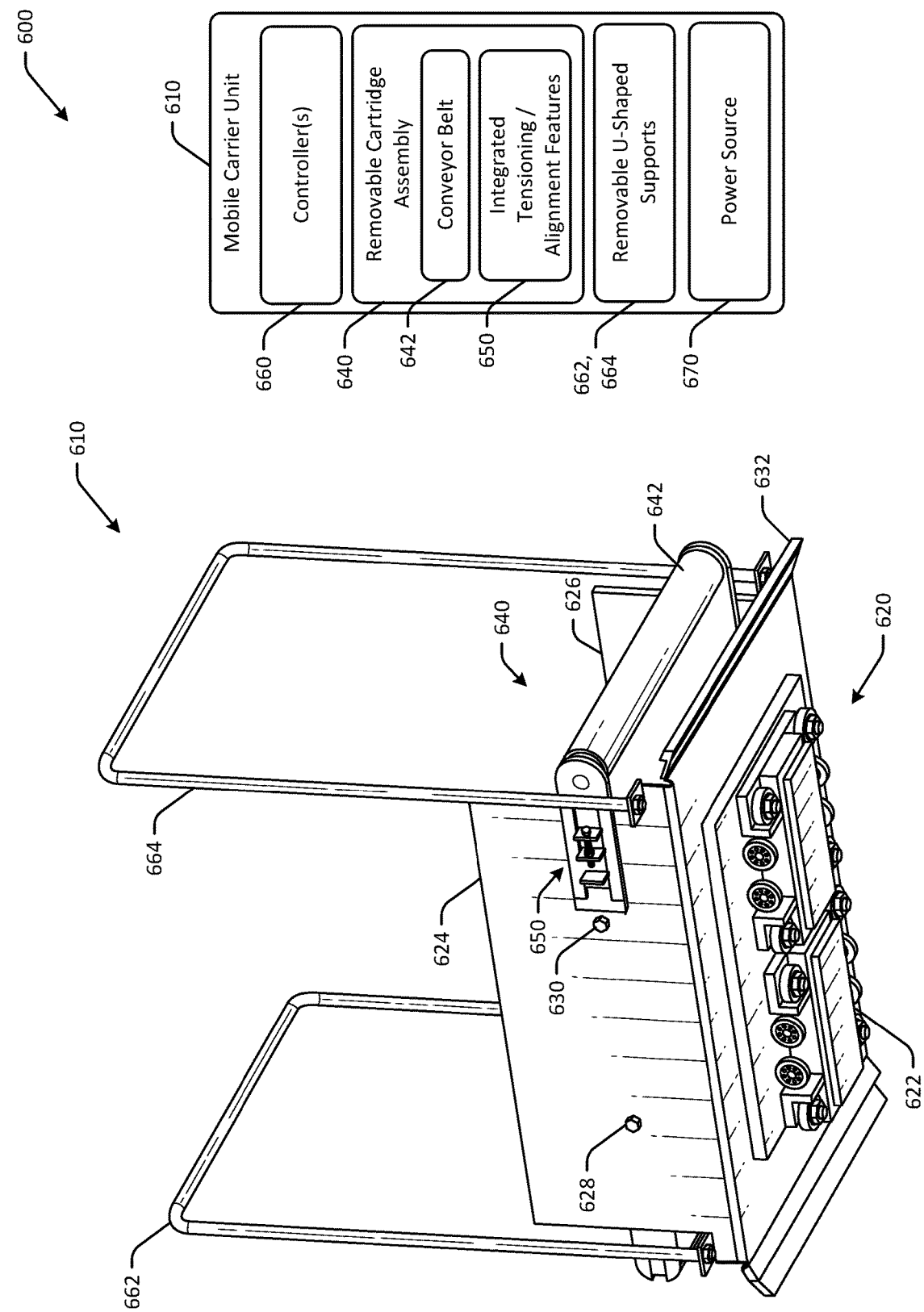
FIG. 6 is a schematic illustration of a mobile carrier unit with a removable conveyor cartridge assembly in accordance with one or more embodiments of the disclosure.

FIG. 6 is a schematic illustration of a mobile carrier unit with a removable conveyor cartridge assembly 600 in accordance with one or more embodiments of the disclosure. Other embodiments may include additional or fewer components. The illustration of FIG. 6 may not be to scale, and may not be illustrated to scale with respect to other figures. The mobile carrier unit with a removable conveyor cartridge assembly illustrated in FIG. 6 may be the same mobile carrier unit discussed with respect to FIGS. 1-5.

In FIG. 6, a mobile carrier unit 610 is depicted with a removable cartridge assembly 640. The mobile carrier unit 610 may be used with any suitable material handling equipment, such as item sortation and/or autonomous transport systems. In some embodiments, the mobile carrier unit 610 may be configured to removably couple to the removable cartridge assembly 640. The removable cartridge assembly 640 may be configured to facilitate loading and/or unloading of objects or items onto and off of the mobile carrier unit 610. The removable cartridge assembly 640 may include a conveyor belt segment. Unlike other mobile carrier units, the removable cartridge assembly 640 may be removed or decoupled from the mobile carrier unit 610 without complete removal of the mobile carrier unit 610 from the material handling equipment. In some embodiments, the removable cartridge assembly 640 may include features such as a built-in belt tensioner and/or various alignment features. As a result, the removable cartridge assembly 640 may be easily swapped from the main vehicle or mobile carrier unit 610.

The mobile carrier unit 610 (which may the mobile carrier unit discussed with respect to FIG. 5) is depicted in perspective view. The mobile carrier unit 610 may be configured to transport items from one location to another. The mobile carrier unit 610 may include one or more sidewalls, such as a set of at least two fixed sidewalls. For example, the mobile carrier unit 610 may include a first sidewall 624 and a second sidewall 626 that is parallel to the first sidewall 624. The first sidewall 624 and the second sidewall 626 may form one or more open ends of the mobile carrier unit 610. An open end may be an end without a sidewall. The sidewalls may prevent items from rolling or otherwise dropping off sides of the mobile carrier unit 610. The respective first sidewall 624 and second sidewall 626 may include alignment holes that may be used to quickly position the removable cartridge assembly 640 when coupling the removable cartridge assembly 640 to the mobile carrier unit 610. For example, the first sidewall 624 may include a first alignment hole 628 and a second alignment hole 630. The first alignment hole 628 and the second alignment hole 630 may correspond to alignment holes in the removable cartridge assembly 640. The removable cartridge assembly 640 may include a main vehicle portion 620 that may be used to couple the removable cartridge assembly 640 to, for example, a track of an item sortation system. The main vehicle portion 620 may include one or more magnets 622 that may be used for linear induction motion, as well as one or more wheels. Other forms of propulsion may be used. The main vehicle portion 620 may include a platform 632 to which the magnets 622 and sidewalls are coupled. The main vehicle portion 620 may include wheels and a magnet coupled to a lower surface of the mobile carrier unit 610. In some embodiments, the mobile carrier unit 610 may include a set of magnets disposed along a lower surface, where the mobile carrier unit 610 is configured to move using a linear induction motor.

A set of one or more U-shaped supports may be coupled to the platform 632 of the mobile carrier unit 610. The U-shaped supports may be used to facilitate retention of items on the mobile carrier unit 610 during transport. In some instances, the U-shape of the U-shaped supports may allow for items to be loaded and/or unloaded from the mobile carrier unit 610 through the U-shape portions. For example, a first U-shaped support 662 may be disposed on a first side of the mobile carrier unit 610 and a second U-shaped support 664 may be disposed on a second side of the mobile carrier unit 610. The respective U-shaped supports 662, 664 may be removable or detachable from the mobile carrier unit 610.

The mobile carrier unit 610 may include one or more controllers 660 and a power source 670. The power source 670 may be a battery, a capacitor bank, a wired power source, or another power source. A battery may be rechargeable, and a capacitor bank may be charged during motion of the mobile carrier unit 610. The controller 660 may be configured to control operation of the mobile carrier unit 610, such as determining where to direct the mobile carrier unit 610, when to activate the conveyor belt of the removable cartridge assembly 640, and so forth. The mobile carrier unit 610 may, in some instances, use the controller 660 to execute commands received from a computer system associated with an item sorting system on which the mobile carrier unit 610 is operating.

The removable cartridge assembly 640 may be coupled to the mobile carrier unit 610 as a single unit. For example, the removable cartridge assembly 640 may be coupled to and removed from the mobile carrier unit 610 as an entire assembly. The removable cartridge assembly 640 may be coupled to the sidewalls of the mobile carrier unit 610 in some embodiments. In some instances, there may be a gap between the removable cartridge assembly 640 and the platform 632.

The removable cartridge assembly 640 may include a conveyor belt 642 and one or more integrated tensioning/alignment features 650. The conveyor belt 642 may be configured to move in a forward and/or reverse direction to facilitate loading and unloading of items onto the mobile carrier unit 610, as well as to facilitate unloading/off-boarding of items into a tote or other container or belt. The removable cartridge assembly 640 may be a conveyor cartridge assembly that is removably coupled to the main vehicle portion 620, and may be configured to be removed from the mobile carrier unit 610 while the mobile carrier unit 610 is coupled to the item sorting system or other equipment. The integrated tensioning/alignment features 650 may include one or more features that are formed in a monolithic sheet metal component, thereby simplifying design, reducing complexity, reducing cost, and increasing serviceability. The integrated tensioning/alignment features 650 may be used to tension and un-tension the conveyor belt 642, and to quickly align the removable cartridge assembly 640 during installation.

Figure 7:
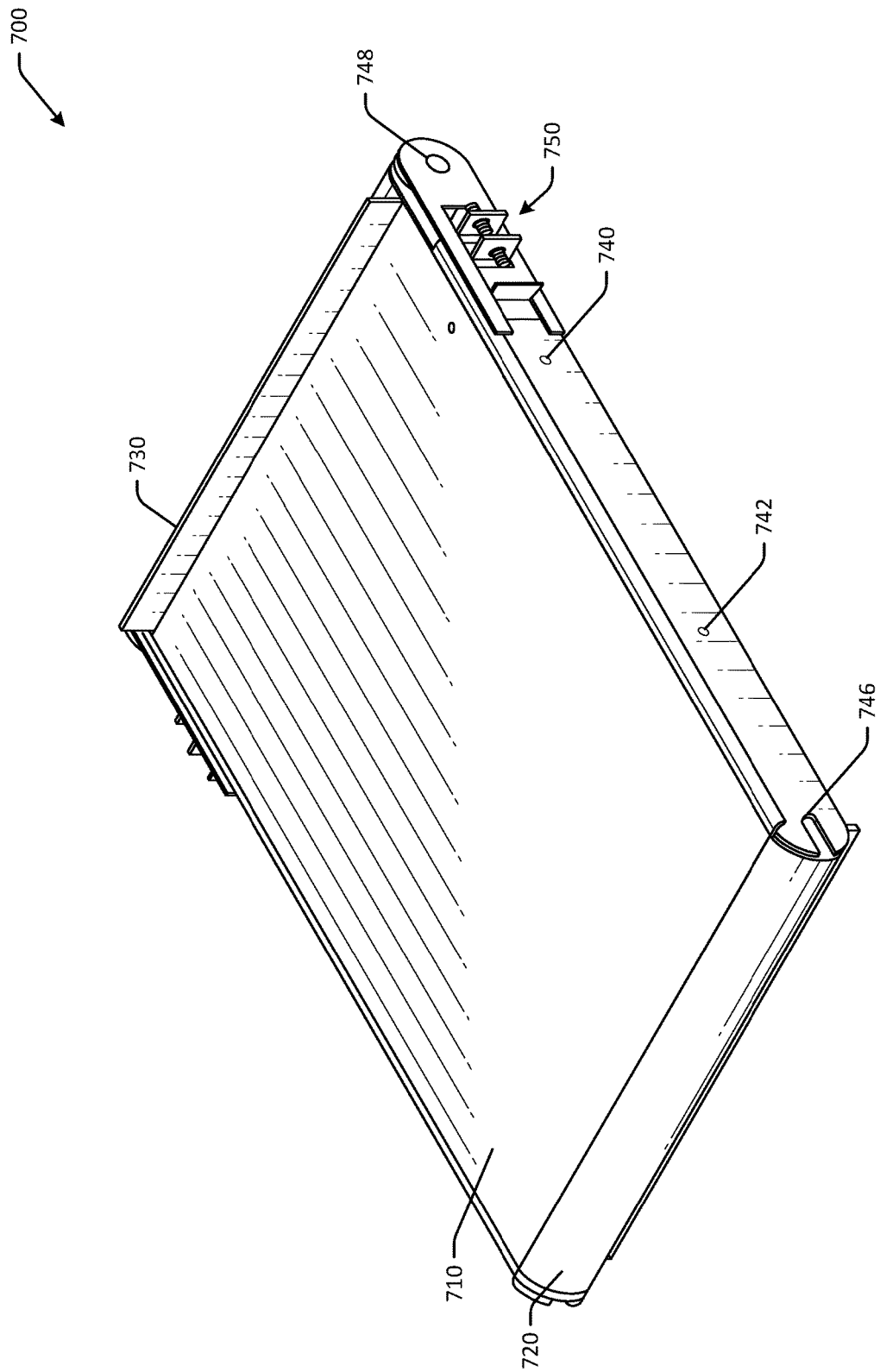
FIG. 7 is a schematic illustration of a removable conveyor cartridge assembly in accordance with one or more embodiments of the disclosure.

FIG. 7 is a schematic illustration of a removable conveyor cartridge assembly 700 in accordance with one or more embodiments of the disclosure. Other embodiments may include additional or fewer components. The illustration of FIG. 7 may not be to scale, and may not be illustrated to scale with respect to other figures. The removable conveyor cartridge assembly illustrated in FIG. 7 may be the same removable conveyor cartridge assembly discussed with respect to FIGS. 1-6.

In some embodiments, the removable conveyor cartridge assembly 700 may include portions formed of a single monolithic material, such as sheet metal. The tabs and flanges within the sheet metal structure may provide features for belt tensioning and alignment.

For example, the removable conveyor cartridge assembly 700 may be a removable assembly that includes a frame, a conveyor belt 710 disposed about the frame and configured to be removed from the frame, and a first sheet metal component 748 coupled to a first side of the frame. The conveyor belt 710 may include a built-in constraining feature, such as a raised tab or protrusion 730 that forms a short retention wall to secure items loaded onto the conveyor belt 710. In some embodiments, the raised protrusion 730 may extend transverse to the conveyor belt 710, such as perpendicular to the conveyor belt 710, where the raised protrusion 730 is configured to retain objects on the conveyor belt 710. The raised tab 730 may move with the conveyor belt 710. The conveyor belt 710 may include rounded side portions 720 where the conveyor belt 710 may pass from an upper surface to a lower surface of the removable convey or cartridge assembly 700.

The first sheet metal component 748 may be a monolithic sheet metal component, in that the entire component is formed from a single piece of sheet metal or other material. The first sheet metal component 748 may include a set of alignment holes that align with corresponding holes on sidewalls of the mobile carrier unit. For example, the first sheet metal component 748 may include a first alignment hole 742 and a second alignment hole 740 that align with respective corresponding alignment holes on the sidewalls of the mobile carrier unit, so as to facilitate quick alignment during installation of the removable conveyor cartridge assembly 700. The first sheet metal component 748 may include integrated tensioning/alignment features 750, discussed in detail with respect to FIG. 8. The first sheet metal component 748 may include a cutout portion 746 that may be used to couple and/or decouple a roller for an end of the removable conveyor cartridge assembly 700 about which the conveyor belt 710 rolls.

The removable conveyor cartridge assembly 700 may include sheet metal components on both sides of the removable conveyor cartridge assembly 700. For example, the removable conveyor cartridge assembly 700 may include a second sheet metal component coupled to a second side of the frame, the second sheet metal component having a second set of tabs extending from the second sheet metal component.

Figure 8:
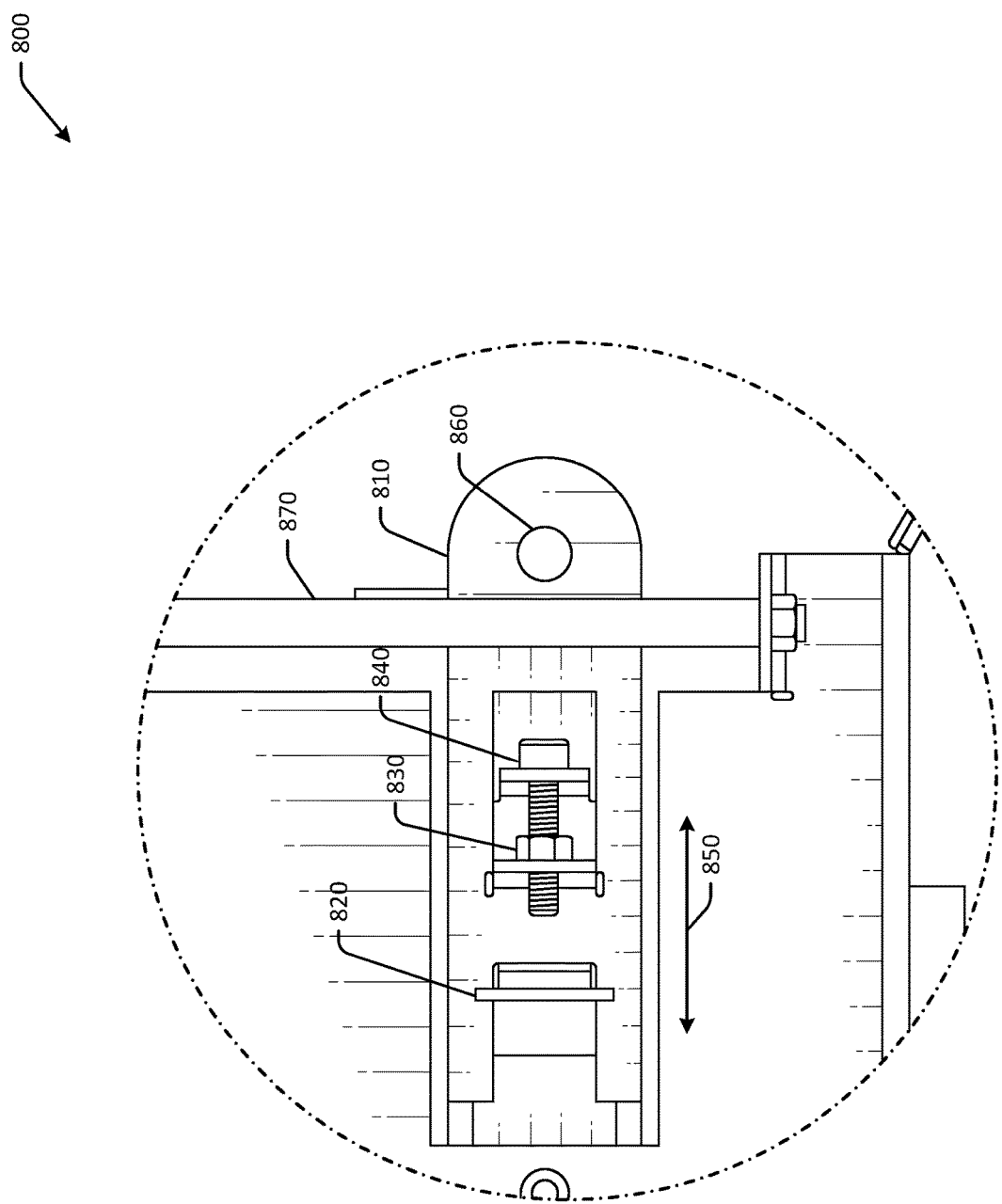
FIG. 8 is a schematic illustration of a detail view of a portion of a removable conveyor cartridge assembly in accordance with one or more embodiments of the disclosure.

FIG. 8 is a schematic illustration of a detail view of a portion of a removable conveyor cartridge assembly 800 in accordance with one or more embodiments of the disclosure. Other embodiments may include additional or fewer components. The illustration of FIG. 8 may not be to scale, and may not be illustrated to scale with respect to other figures. The removable conveyor cartridge assembly illustrated in FIG. 8 may be the same removable conveyor cartridge assembly discussed with respect to FIGS. 1-7.

In FIG. 8, a portion of a sheet metal component is depicted in detail view. In particular, a detail view of integrated tensioning/alignment features of the sheet metal component is illustrated. The illustrated integrated tensioning/alignment features may correspond to the integrated tensioning/alignment features 750 of FIG. 7.

The sheet metal component may include a set of tabs extending from the sheet metal component. The tabs may be cutout from the sheet metal component and bent outwards. As a result, the tabs may be formed using the monolithic sheet metal component and may not require separate machining or machined parts. For example, the sheet metal component may include a first tab 820 and a second tab 830.

The tabs may be used in conjunction with a tensioning device configured to tension a conveyor belt 810. The tensioning device may be used to increase tension, decrease tension, or otherwise adjust tension of the conveyor belt 810. For example, manipulation of the tensioning device may cause a roller 860 to move along direction 850, where movement of the roller inwards results in untensioning of the conveyor belt 810, and movement of the roller outwards results in tensioning of the conveyor belt 810. The tensioning device may include a first screw 840 that engages a first tab 830 of the first set of tabs. Other embodiments may use bolts, pins, switches, clamps, or other devices. Tightening of the first screw 840 may decrease tension of the conveyor belt 180, and loosening of the first screw 840 may increase tension of the conveyor belt 810. The first set of tabs may form one or more slots through which portions of the frame may be positioned. For example, the first set of tabs may form a slot that engages a T-shaped component 820 of the frame to align the frame and the sheet metal component. The T-shaped component 820 may slide into the slot formed by the first set of tabs to align the sheet metal component and the frame. A portion of the U-shaped support 870 is also depicted in FIG. 8.

Figure 9:
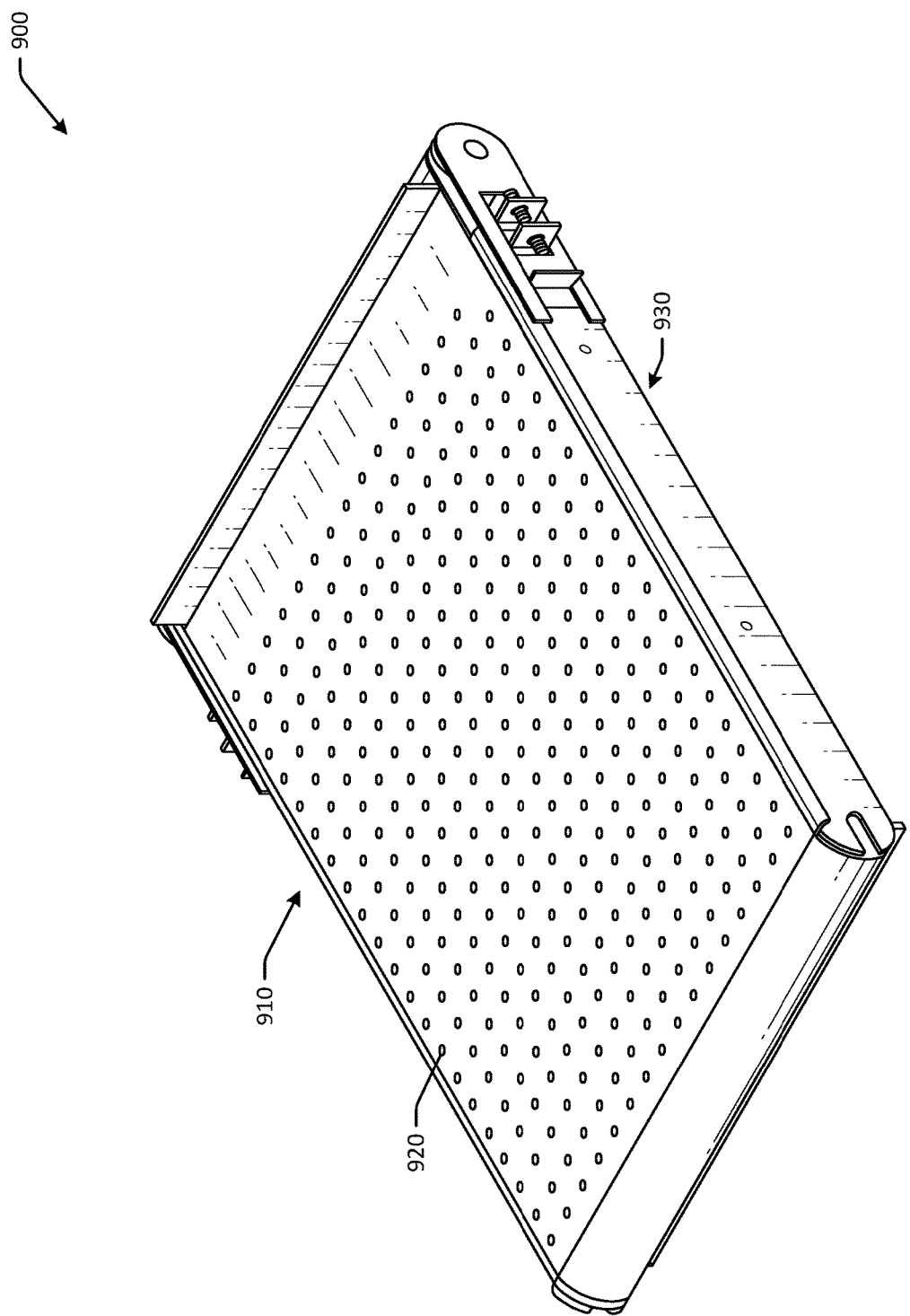
FIG. 9 is a schematic illustration of a removable conveyor cartridge assembly in accordance with one or more embodiments of the disclosure.

FIG. 9 is a schematic illustration of a removable conveyor cartridge assembly 900 in accordance with one or more embodiments of the disclosure. Other embodiments may include additional or fewer components. The illustration of FIG. 9 may not be to scale, and may not be illustrated to scale with respect to other figures. The mobile carrier unit illustrated in FIG. 9 may be the same mobile carrier unit discussed with respect to FIGS. 1-8.

In some instances, items carried on a mobile carrier unit, or more specifically, on a conveyor belt of a mobile carrier unit, may move during transport. For example, round or cylindrical items may move around the conveyor belt, as well as flat items, during transport. Other items, such as items that are light in weight, may be prone to movement. Depending on a speed of the mobile carrier unit, items may move more or less. As a result, some removable conveyor cartridge assemblies may include vacuum or suction systems to assist with retaining items on the conveyor belt during transport. Such systems may be discrete in that the systems may not be in the way or otherwise interfere with loading and unloading of items onto or off of the conveyor belt. In addition to features such as friction, weight, and speed of the conveyor belt, some embodiments may include a vacuum system.

For example, in FIG. 9, the removable conveyor cartridge assembly 900 may include a vacuum system. The vacuum system may generate negative air pressure along a surface of a conveyor belt 910 of the removable conveyor cartridge assembly 900 during transport, so as to provide additional grip on the item being transported. In some embodiments, vacuum or suction may be generated by an accumulator that may be onboard, or may be provided from an external source. For example, the removable conveyor cartridge assembly 900 may include a suction device 930 disposed within the removable assembly, where the suction device is configured to generate suction along an upper surface of the removable assembly. In order for the suction to be applied to the item, the conveyor belt 910 may include a plurality of perforations 920 or apertures that allow for air to flow through the conveyor belt 910. The upper surface of the removable conveyor cartridge assembly 900 may also include apertures to allow for suction or negative air pressure to be applied along the upper surface of the removable conveyor cartridge assembly 900. As a result, items on the conveyor belt may be retained in place. After transit, the suction may be disabled to facilitate offloading of the item from the removable conveyor cartridge assembly 900.

Figure 10:
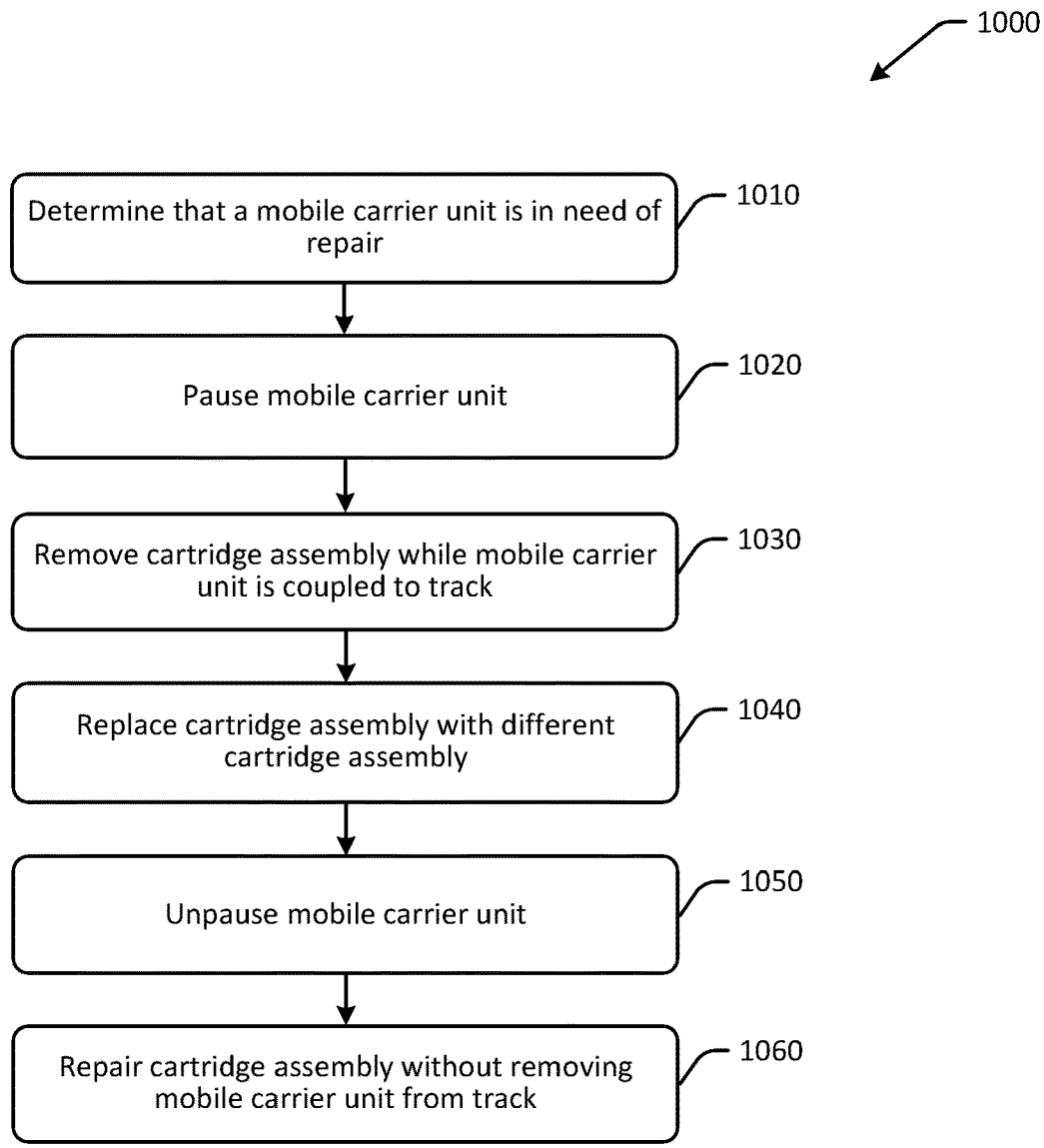
FIG. 10 is a schematic illustration of an example process flow for removing a removable conveyor cartridge assembly in accordance with one or more embodiments of the disclosure.

FIG. 10 is a schematic illustration of an example process flow 1000 for removing a removable conveyor cartridge assembly in accordance with one or more embodiments of the disclosure. One or more of the blocks illustrated in FIG. 10 may be performed in a different order. The process flow 1000 may be executed by an operator or other personnel using material handling equipment, such as an item sortation system.

At block 1010, it may be determined that a mobile carrier unit is in need of repair. For example, the mobile carrier unit may be due for scheduled or unscheduled maintenance, or may otherwise be in need of a repair. At block 1020, the mobile carrier unit may be paused. For example, the mobile carrier unit may be in use with an item sortation system, an item movement or handling system, or another machine. The mobile carrier unit may be paused during operation. In some instances, the mobile carrier unit may remain coupled to the machine while paused. At block 1030, a cartridge assembly may be removed from the mobile carrier unit while the mobile carrier unit is coupled to a track or other component of the machine. The cartridge assembly may be the removable conveyor belt cartridge assembly discussed with respect to any one of FIGS. 6-9. To remove the cartridge assembly, the operator may remove bolts coupled to alignment holes in both the sidewalls of the mobile carrier unit and sheet metal component of the cartridge assembly. The cartridge assembly may include the conveyor belt and may be removed as a single unit from the mobile carrier unit (e.g., leaving behind the main vehicle, U-shaped supports, etc.). At block 1040, the cartridge assembly may be replaced with a different cartridge assembly. For example, the cartridge assembly may be replaced with a different cartridge assembly that is already repaired or for which maintenance has already been completed. In this manner, the cartridge assembly may be swapped out as a single module. At block 1050, the mobile carrier unit may be unpaused or may otherwise resume normal operation. For example, the mobile carrier unit may be sent back into normal operation after the cartridge assembly is swapped. As a result, downtime of the mobile carrier unit may be eliminated or reduced, relative to a repair process in which the entire mobile carrier unit is removed from the machine during service. At block 1060, the removed cartridge assembly may be repaired separately, while the mobile carrier unit is not removed from the machine. For example, the removed cartridge assembly may be repaired at a workbench or elsewhere. When complete, the removed cartridge assembly can be swapped with another cartridge assembly that is in need of repair in a modular fashion.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 11:
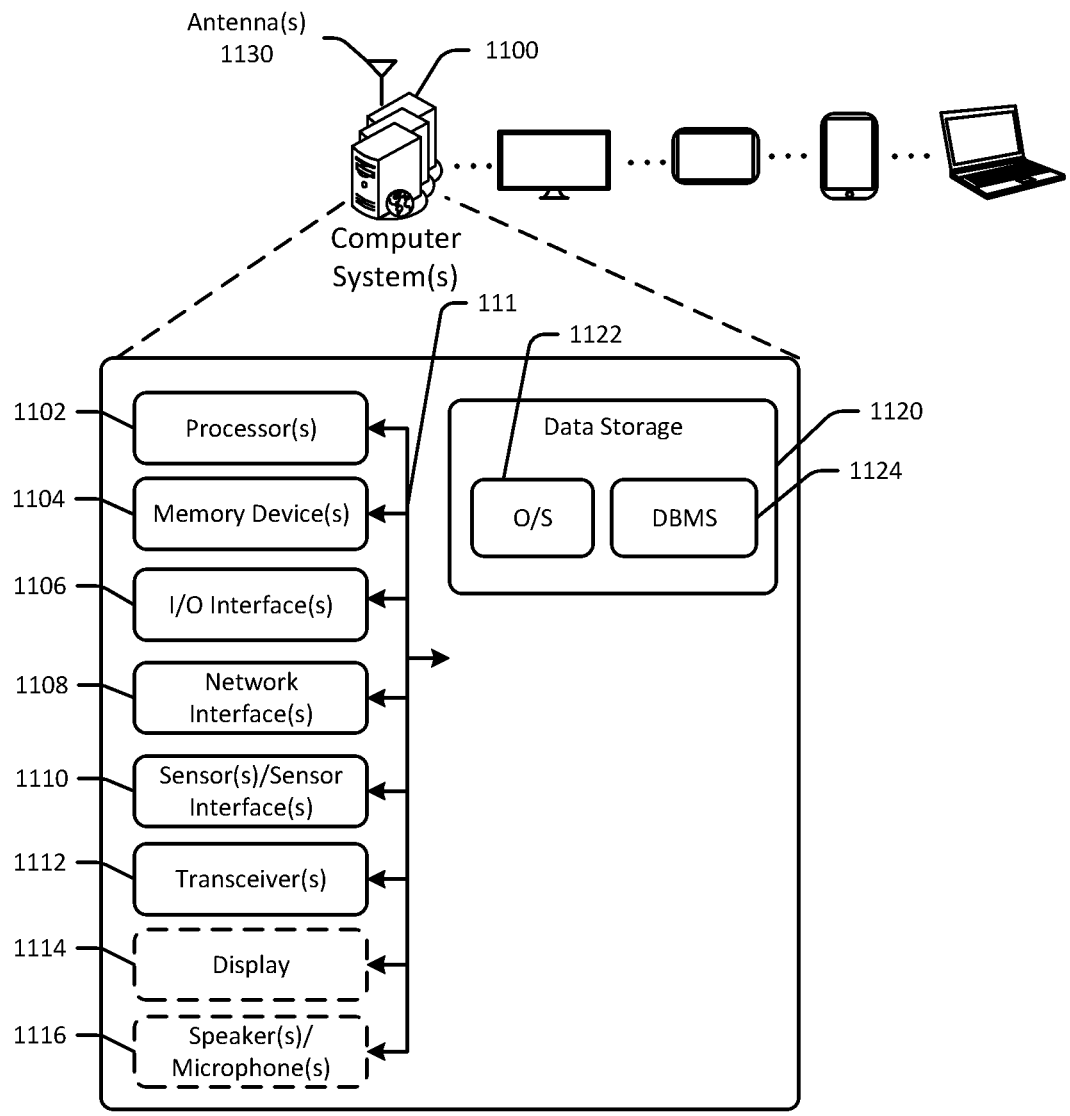
FIG. 11 schematically illustrates an example architecture of a computer system associated with a mobile carrier unit and/or item sorting system in accordance with one or more embodiments of the disclosure.

FIG. 11 is a schematic block diagram of one or more illustrative computer system(s) 1100 in accordance with one or more example embodiments of the disclosure. The computer system(s) 1100 may the controller of the gate assemblies and/or the mobile carrier units described with respect to FIGS. 1-10, and may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1100 may correspond to an illustrative device configuration for the controller(s) or computer system(s) of FIGS. 1-10.

The computer system(s) 1100 may be configured to communicate with one or more servers, user devices, or the like. The computer system(s) 1100 may be configured to control sortation system components.

The computer system(s) 1100 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1100 may include one or more processors (processor(s)) 1102, one or more memory devices 1104 (also referred to herein as memory 1104), one or more input/output (I/O) interface(s) 1106, one or more network interface(s) 1108, one or more sensor(s) or sensor interface(s) 1110, one or more transceiver(s) 1112, one or more optional display(s) 1114, one or more optional microphone(s) 1116, and data storage 1120. The computer system(s) 1100 may further include one or more bus(es) 1118 that functionally couple various components of the computer system(s) 1100. The computer system(s) 1100 may further include one or more antenna(e) 1130 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1118 may include at least one of a system bus, a memory bus, an address bus, or a message bus, and may permit the exchange of information (e.g., data (including computer-executable code), signaling, etc.) between various components of the computer system(s) 1100. The bus(es) 1118 may include, without limitation, a memory bus or a memory controller, a peripheral bus, an accelerated graphics port, and so forth. The bus(es) 1118 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1104 of the computer system(s) 1100 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1104 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1104 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1120 may include removable storage and/or non-removable storage including, but not limited to, magnetic storage, optical disk storage, and/or tape storage. The data storage 1120 may provide non-volatile storage of computer-executable instructions and other data. The memory 1104 and the data storage 1120, removable and/or non-removable, are examples of computer-readable storage media (CRSM) as that term is used herein.

The data storage 1120 may store computer-executable code, instructions, or the like that may be loadable into the memory 1104 and executable by the processor(s) 1102 to cause the processor(s) 1102 to perform or initiate various operations. The data storage 1120 may additionally store data that may be copied to the memory 1104 for use by the processor(s) 1102 during the execution of the computer-executable instructions. Moreover, output data generated as a result of execution of the computer-executable instructions by the processor(s) 1102 may be stored initially in the memory 1104, and may ultimately be copied to the data storage 1120 for non-volatile storage.

More specifically, the data storage 1120 may store one or more operating systems (O/S) 1122; one or more database management systems (DBMS) 1124; and one or more program module(s), applications, engines, computer-executable code, scripts, or the like. Some or all of these module(s) may be sub-module(s). Any of the components depicted as being stored in the data storage 1120 may include any combination of software, firmware, and/or hardware. The software and/or firmware may include computer-executable code, instructions, or the like that may be loaded into the memory 1104 for execution by one or more of the processor(s) 1102. Any of the components depicted as being stored in the data storage 1120 may support functionality described in reference to corresponding components named earlier in this disclosure.

The data storage 1120 may further store various types of data utilized by the components of the computer system(s) 1100. Any data stored in the data storage 1120 may be loaded into the memory 1104 for use by the processor(s) 1102 in executing computer-executable code. In addition, any data depicted as being stored in the data storage 1120 may potentially be stored in one or more datastore(s) and may be accessed via the DBMS 1124 and loaded in the memory 1104 for use by the processor(s) 1102 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1102 may be configured to access the memory 1104 and execute the computer-executable instructions loaded therein. For example, the processor(s) 1102 may be configured to execute the computer-executable instructions of the various program module(s), applications, engines, or the like of the computer system(s) 1100 to cause or facilitate various operations to be performed in accordance with one or more embodiments of the disclosure. The processor(s) 1102 may include any suitable processing unit capable of accepting data as input, processing the input data in accordance with stored computer-executable instructions, and generating output data. The processor(s) 1102 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1102 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1102 may be capable of supporting any of a variety of instruction sets.

Referring now to other illustrative components depicted as being stored in the data storage 1120, the O/S 1122 may be loaded from the data storage 1120 into the memory 1104 and may provide an interface between other application software executing on the computer system(s) 1100 and the hardware resources of the computer system(s) 1100. More specifically, the O/S 1122 may include a set of computer-executable instructions for managing the hardware resources of the computer system(s) 1100 and for providing common services to other application programs (e.g., managing memory allocation among various application programs). In certain example embodiments, the O/S 1122 may control execution of the other program module(s). The O/S 1122 may include any operating system now known or which may be developed in the future including, but not limited to, any server operating system, any mainframe operating system, or any other proprietary or non-proprietary operating system.

The DBMS 1124 may be loaded into the memory 1104 and may support functionality for accessing, retrieving, storing, and/or manipulating data stored in the memory 1104 and/or data stored in the data storage 1120. The DBMS 1124 may use any of a variety of database models (e.g., relational model, object model, etc.) and may support any of a variety of query languages. The DBMS 1124 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1100 is a mobile device, the DBMS 1124 may be any suitable lightweight DBMS optimized for performance on a mobile device.

Referring now to other illustrative components of the computer system(s) 1100, the input/output (I/O) interface(s) 1106 may facilitate the receipt of input information by the computer system(s) 1100 from one or more I/O devices as well as the output of information from the computer system(s) 1100 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1100 or may be separate. The I/O devices may further include, for example, any number of peripheral devices such as data storage devices, printing devices, and so forth.

The I/O interface(s) 1106 may also include an interface for an external peripheral device connection such as universal serial bus (USB), FireWire, Thunderbolt, Ethernet port or other connection protocol that may connect to one or more networks. The I/O interface(s) 1106 may also include a connection to one or more of the antenna(e) 1130 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1100 may further include one or more network interface(s) 1108 via which the computer system(s) 1100 may communicate with any of a variety of other systems, platforms, networks, devices, and so forth. The network interface(s) 1108 may enable communication, for example, with one or more wireless routers, one or more host servers, one or more web servers, and the like via one or more networks.

The antenna(e) 1130 may include any suitable type of antenna depending, for example, on the communications protocols used to transmit or receive signals via the antenna(e) 1130. Non-limiting examples of suitable antennae may include directional antennae, non-directional antennae, dipole antennae, folded dipole antennae, patch antennae, multiple-input multiple-output (MIMO) antennae, or the like. The antenna(e) 1130 may be communicatively coupled to one or more transceivers 1112 or radio components to which or from which signals may be transmitted or received.

As previously described, the antenna(e) 1130 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1130 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1130 may be configured to transmit or receive radio frequency signals within any suitable frequency range forming part of the unlicensed portion of the radio spectrum.

The antenna(e) 1130 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1112 may include any suitable radio component(s) for—in cooperation with the antenna(e) 1130—transmitting or receiving radio frequency (RF) signals in the bandwidth and/or channels corresponding to the communications protocols utilized by the computer system(s) 1100 to communicate with other devices. The transceiver(s) 1112 may include hardware, software, and/or firmware for modulating, transmitting, or receiving—potentially in cooperation with any of antenna(e) 1130—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1112 may further include hardware, firmware, or software for receiving GNSS signals. The transceiver(s) 1112 may include any known receiver and baseband suitable for communicating via the communications protocols utilized by the computer system(s) 1100. The transceiver(s) 1112 may further include a low noise amplifier (LNA), additional signal amplifiers, an analog-to-digital (A/D) converter, one or more buffers, a digital baseband, or the like.

The sensor(s)/sensor interface(s) 1110 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1114 may be configured to output light and/or render content. The optional speaker(s)/microphone(s) 1116 may be any device configured to receive analog sound input or voice data.

It should be appreciated that the program module(s), applications, computer-executable instructions, code, or the like depicted in FIG. 11 as being stored in the data storage 1120 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1100, and/or hosted on other computing device(s) accessible via one or more networks, may be provided to support functionality provided by the program module(s), applications, or computer-executable code depicted in FIG. 11 and/or additional or alternate functionality. Further, functionality may be modularized differently such that processing described as being supported collectively by the collection of program module(s) depicted in FIG. 11 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 11 may be implemented, at least partially, in hardware and/or firmware across any number of devices.

It should further be appreciated that the computer system(s) 1100 may include alternate and/or additional hardware, software, or firmware components beyond those described or depicted without departing from the scope of the disclosure. More particularly, it should be appreciated that software, firmware, or hardware components depicted as forming part of the computer system(s) 1100 are merely illustrative and that some components may not be present or additional components may be provided in various embodiments. While various illustrative program module(s) have been depicted and described as software module(s) stored in the data storage 1120, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-10 may be performed by a device having the illustrative configuration depicted in FIG. 11, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-10 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item sorting system comprising:
   an induction portion at which an object for sortation is input at the item sorting system;
   a plurality of containers; and
   a mobile carrier unit configured to transport the object from the induction portion to a designated container of the plurality of containers, the mobile carrier unit comprising:
   a main vehicle comprising wheels and a magnet coupled to a lower surface of the main vehicle;
   a set of U-shaped supports coupled to the main vehicle and configured to secure the object; and
   a conveyor cartridge assembly removably coupled to the main vehicle, the conveyor cartridge assembly comprising:
   a frame;
   a conveyor belt disposed about the frame and configured to be removed from the frame;
   a first sheet metal component coupled to a first side of the frame, the first sheet metal component comprising a first set of tabs extending from the first sheet metal component; and
   a tensioning device configured to tension the conveyor belt, the tensioning device comprising a first screw that engages a first tab of the first set of tabs.

2. The item sorting system of claim 1, wherein tightening of the first screw decreases tension of the conveyor belt, and loosening of the first screw increases tension of the conveyor belt.

3. The item sorting system of claim 1, wherein the conveyor cartridge assembly is configured to be removed from the mobile carrier unit while the mobile carrier unit is coupled to the item sorting system.

4. The item sorting system of claim 1, wherein the first sheet metal component further comprises a set of alignment holes that align with corresponding holes on sidewalls of the mobile carrier unit.

5. A removable assembly for a mobile carrier unit of a sortation system, the removable assembly comprising:
  a frame;
  a conveyor belt disposed about the frame and configured to be removed from the frame;
  a first sheet metal component coupled to a first side of the frame, the first sheet metal component comprising a first set of tabs extending from the first sheet metal component; and
  a tensioning device configured to tension the conveyor belt, the tensioning device comprising a first screw that engages a first tab of the first set of tabs, wherein the first tab is cutout from the first sheet metal component and bent outwards.

6. The removable assembly of claim 5, wherein the removable assembly is coupled to a main vehicle of the mobile carrier unit.

7. The removable assembly of claim 5, wherein the mobile carrier unit comprises a set of U-shaped supports configured to retain objects on the mobile carrier unit.

8. The removable assembly of claim 5, wherein the first sheet metal component is a monolithic sheet metal component.

9. The removable assembly of claim 5, wherein the first sheet metal component further comprises a set of alignment holes that align with corresponding holes on sidewalls of the mobile carrier unit.

10. The removable assembly of claim 5, wherein the conveyor belt comprises:
  a raised protrusion extending transverse to the conveyor belt, the raised protrusion configured to retain objects on the conveyor belt.

11. The removable assembly of claim 5, further comprising:
  a suction device disposed within the removable assembly, the suction device configured to generate suction along an upper surface of the removable assembly;
  wherein the conveyor belt comprises a plurality of perforations.

12. The removable assembly of claim 5, wherein tightening of the first screw decreases tension of the conveyor belt, and loosening of the first screw increases tension of the conveyor belt.

13. The removable assembly of claim 5, wherein the first set of tabs forms a slot that engages a T-shaped component of the frame.

14. The removable assembly of claim 5, further comprising:
  a second sheet metal component coupled to a second side of the frame, the second sheet metal component comprising a second set of tabs extending from the second sheet metal component;
  wherein the tensioning device further comprises a second screw that engages a second tab of the second set of tabs.

15. A mobile carrier unit system comprising:
  a main vehicle comprising a frame and sidewalls;
  a set of U-shaped supports coupled to the frame; and
  a removable conveyor cartridge assembly comprising:
    a conveyor belt comprising a raised tab that moves with the conveyor belt;
    a first sheet metal component comprising a first set of tabs extending from the first sheet metal component; and
    a tensioning device configured to tension the conveyor belt, the tensioning device comprising a first screw that engages a first tab of the first set of tabs.

16. The mobile carrier unit system of claim 15, further comprising:
  a set of magnets disposed along a lower surface of the main vehicle, wherein the main vehicle is configured to move using a linear induction motor.

17. The mobile carrier unit system of claim 15, wherein the first sheet metal component comprises first alignment holes, and the sidewalls comprise corresponding second alignment holes.

18. The mobile carrier unit system of claim 15, wherein tightening of the first screw decreases tension of the conveyor belt, and loosening of the first screw increases tension of the conveyor belt.

19. The mobile carrier unit system of claim 15, wherein the first set of tabs forms a slot that engages a T-shaped component of the frame.

20. The mobile carrier unit system of claim 15, wherein the first sheet metal component is a monolithic sheet metal component.

* * * * *